United States Patent [19]

Ichiyoshi et al.

[11] Patent Number: 5,043,822
[45] Date of Patent: Aug. 27, 1991

[54] VIDEO CAMERA APPARATUS

[75] Inventors: Hiroyuki Ichiyoshi, Kanagawa; Kazunori Kashimura, Tokyo, both of Japan

[73] Assignee: Canon Kabushiki Kaisha, Tokyo, Japan

[21] Appl. No.: 561,927

[22] Filed: Aug. 2, 1990

Related U.S. Application Data

[63] Continuation of Ser. No. 266,950, Nov. 3, 1988, Pat. No. 4,963,987.

[30] Foreign Application Priority Data

Nov. 6, 1987 [JP] Japan .................................. 62-279331
Sep. 30, 1988 [JP] Japan .................................. 62-128522
Sep. 30, 1988 [JP] Japan .................................. 62-128523

[51] Int. Cl.$^5$ ............................................. H04N 5/30
[52] U.S. Cl. ...................................... 358/229; 358/224
[58] Field of Search ................ 358/229, 224, 209, 909

[56] References Cited

U.S. PATENT DOCUMENTS

| | | | |
|---|---|---|---|
| 3,845,238 | 10/1974 | Schneider et al. | 358/229 |
| 4,494,149 | 1/1985 | Komine | 358/224 |
| 4,550,343 | 10/1985 | Nakatani | 358/224 |
| 4,591,254 | 5/1986 | Sokolawski | 358/224 |
| 4,682,240 | 7/1987 | Bachmann | 358/224 |
| 4,757,388 | 7/1988 | Someya et al. | 358/224 |

Primary Examiner—Stephen Brinich
Attorney, Agent, or Firm—Robin, Blecker, Daley & Driscoll

[57] ABSTRACT

A video camera apparatus is arranged such that an electronic viewfinder and a grip portion incorporating a driving circuit therefor are installed rotatably on a video camera body so that an angle of installation of the grip portion is made changeable with respect to the video camera body.

13 Claims, 8 Drawing Sheets

VIDEO CAMERA APPARATUS

This application is a continuation of application Ser. No. 266,950, filed 11/3/88 now U.S. Pat. No. 4,963,987 issued Oct. 16, 1990.

BACKGROUND OF THE INVENTION

1. Field of the Invention

The present invention relates to a video camera apparatus and, more particularly, to a video camera apparatus suitable for use in a video camera having a grip portion and a viewfinder.

2. Description of the Related Art

Conventionally, with respect to a video camera apparatus and a camera-integrating recorder (camcorder) in which a video camera and a video recorder are incorporated integrally, various types in which a camera unit, a lens, a recorder unit, a grip portion, a viewfinder unit, etc. are all accommodated in one casing have been proposed and made into products. This type of video camera and camera-integrating recorder are not suitable for shooting with a low of high angle.

To cope with this problem, there is a type in which another lens for the low angle and still another for the high angle are provided in an eyepiece section, and there is another type in which the viewfinder is made separate from a camera body and is made rotatable with respect to the camera body. However, even if the viewfinder is made adaptable for both the low and high angles, since the grip itself is secured to the camera body, difficulties are encountered in shooting at the low or high angle with the grip held. In addition, although the posture of the viewfinder must be changed with a change in the posture of the operator, it has been difficult to smoothly effect this follow-up.

To solve such problems, a proposal has been made to make the grip portion or the viewfinder unit movable with respect to the camera body so as to improve the operating efficiency.

Figure 1A:
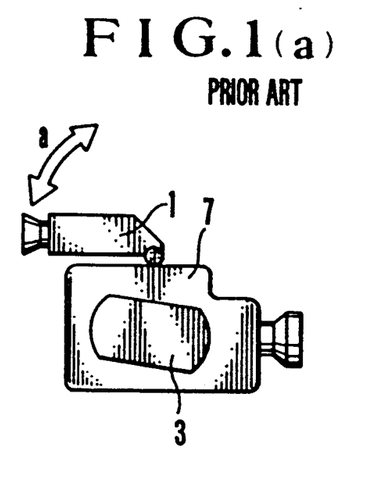
FIGS. 1(a) and 1(b) are side elevational views illustrating examples of a conventional video camera apparatus.
Figure 1B:
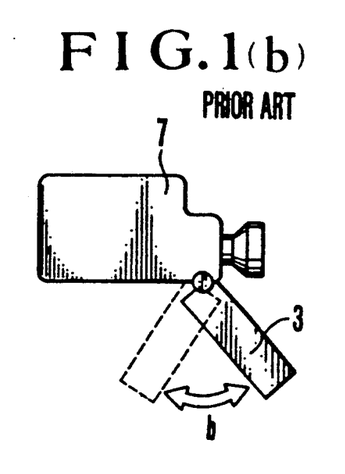

FIGS. 1(a) and 1(b) illustrate an example of this type. FIG. 1(a) is a side-elevational view illustrating a video camera in which a camera grip 3 is secured to a camera body 7. The arrangement is such that a viewfinder 1 us installed rotatably in the direction of the arrow a, thereby making it possible to adjust the inclination of the viewfinder 1 with respect to the camera body 7.

FIG. 1(b) is a side-elevational view illustrating a video camera in which the camera grip 3 is installed on the camera body 7 such as to be rotatable in the direction of the arrow b, thereby making it possible to adjust the inclination of the camera grip 3 with respect to the camera body 7.

However, in the prior art shown in FIG. 1(a), although it is easy to confirm the image in the viewfinder during shooting with a low angle by rotating the viewfinder, since the camera grip is secured, it is difficult to hold the camera grip in a normal state. Hence, it is sometimes necessary to hold the camera with the other hand or to provide a recording trigger switch for the low angle, and the risk of dropping the camera is large. In addition, there is a drawback in that, during shooting with a high angle, no measure is adopted with respect to the direction of an angle of elevation, so that it is difficult to confirm the image in the viewfinder.

Furthermore, in the prior art shown in FIG. 1(b), an attempt is made to obtain the best posture during shooting with a normal angle, and this arrangement is not adaptable to various shooting angles. Hence, there has been a problem in that there are not many variations of shooting.

In addition, as another prior art of this type of apparatus, as disclosed in U.S. Pat. No. 4,494,147, there is a video camera in which the grip portion and the viewfinder unit are integrally arranged, and the grip is made rotatable between a normal shooting position and an accommodating position when the apparatus is not being used, thereby facilitating the accommodation. However, this arrangement failed to take into consideration various camera angles in a shooting state, and the grip is merely made into a movable type.

Meanwhile, if the casing having the viewfinder is made rotatable with respect to the camera body, if the so-called optical viewfinder is used, the arrangement of an optical system becomes complicated, so that it is undesirable. Therefore, an electronic viewfinder (EVF) which uses a small CRT display or the like as a viewfinder is frequently used. The EVF is also advantageous in that information necessary for shooting can be superimposed on an image being shot.

However, if the EVF is used as the viewfinder, the following problems are presented. In other words, a circuit for driving the EVF is necessary, and there is a possibility that a high frequency of a signal generated by this driving circuit exerts an adverse effect on a video signal of the camera. Particularly when a small CRT is used as the EVF, the deflecting voltage becomes a substantially high voltage, so that this effect becomes large.

When shooting information, including a focused state, an exposed state, and various items of alarm information, is generated by a character generator, is superimposed on the image being shot, and is displayed on the EVF, there is the risk that a signal in this character generator exerts an adverse effect on the photographic signal.

As information on the prior art concerning a camera and a grip or a viewfinder, U.S. Pat. No. 2,525,290 is available.

Also, it will be helpful in clarifying the inventiveness of the present invention to refer to the following information on the prior art concerning video cameras: U.S. Pat Nos. 2,315,406, 2,547,030, 2,709,391, 3,659,045, 4,318,133, and 4,368,490, Japanese Laid-Open Patent Application No. 52-52520, and "Compact TV Camera FAE 123 with Electronic viewfinder", by W. Knorr, Grundig Tchnische Information, Mar. 1977, pp. 139–151, as well as "TK-760 Camera A Design Evolution", by Bazin, RCA Broadcast News (USA), No. 165 w, (June 1978), pp. 38–42, and the like.

SUMMARY OF THE INVENTION

Accordingly, a primary object of the present invention is to provide a viewfinder interlinked-type camera grip which can effect shooting safely with a natural posture by providing a camera grip interlinked with a viewfinder on a camera body such as to be rotatable, thereby overcoming the above-described drawbacks of the prior art.

To this end, according to one aspect of the present invention there is provided a video camera apparatus comprising: a viewfinder; a camera grip integrally interlinked with the viewfinder; and installing means for installing the camera grip on a camera body such as to be rotatable, wherein the installing means is arranged to be capable of retaining the camera grip at a desired position within a rotating range with respect to the camera body. Consequently, since the viewfinder and the camera grip are rotated in interlinking manner and the camera grip is set to a desired angle, it is possible to adopt a natural shooting posture not only in the normal angle shooting but also in the low- and high- angle shooting.

A second object of the present invention is to provide a video camera apparatus which is capable of speedily coping with a shooting posture having a high frequency of use and of further improving the operating efficiency.

To this end, according to another aspect of the present invention there is provided a video camera apparatus in which a casing having a viewfinder and a grip is installed rotatably on a camera body, the video camera apparatus comprising: an urging member for urging the casing and the camera body in the direction of being brought into pressure contact with each other via a frictional member; and a positioning mechanism arranged such that an urging force by the urging member is alleviated when the casing and the camera body assume a predetermined rotational phase with respect to each other.

Consequently, the camera body and the grip casing can be made to click at rotating positions corresponding to shooting positions whose frequency of usage is high. At the same time, the camera body can be held stably with respect to the grip casing at the rotating positions. Further, by the use of the urging member, the camera body can be held against the grip casing at a desired rotational phase.

A third object of the present invention is to provide a video camera which is capable of following up a shooting posture and in which an adverse effect on a photographic signal is not generated due to the presence of the EVF while the EVF is being used.

To this end, according to still another aspect of the present invention there is provided a video camera apparatus in which a viewfinder casing having an electronic viewfinder is installed rotatably on a camera body, the video camera apparatus comprising: a driving circuit accommodated in the viewfinder casing and adapted to drive the electronic viewfinder.

Consequently, since a camera unit where a video signal is generated and a driving circuit for driving the electronic view finder are accommodated in separate casings, the effect of the driving circuit for driving the electronic viewfinder on the video signal is small, and as the viewfinder casing is rotated, it becomes possible to cope with any shooting posture.

Still another object of the present invention is to provide a video camera apparatus which excels in operating efficiency and which is constantly capable of setting a camera body, a viewfinder and a grip in optimum positions under various shooting conditions.

The above and other objects, features and advantages of the present invention will become apparent from the following detailed description of the invention when read in conjunction with the accompanying drawings.

DETAILED DESCRIPTION OF THE PREFERRED EMBODIMENTS

Referring now to the accompanying drawings, a detailed description will be given of the embodiments of a video camera apparatus in accordance with the present invention.

It should be noted that, in the following description, a video camera apparatus, a camera-integrating VTR and the like will be collectively referred to as a video camera apparatus.

Figure 2:
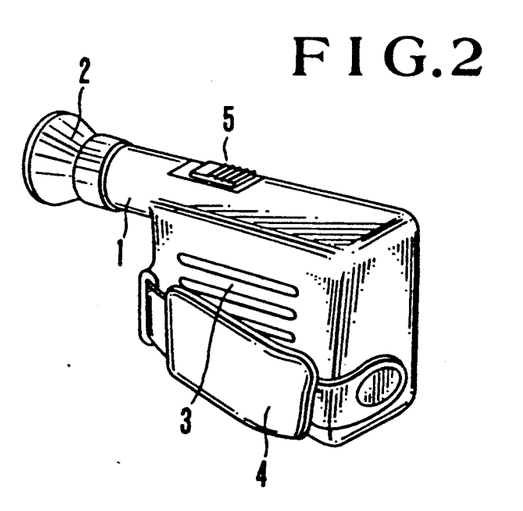
FIG. 2 is a perspective view illustrating a viewfinder interlinked-type camera grip of a video camera apparatus in accordance with a first embodiment of the present invention.
Figure 3:
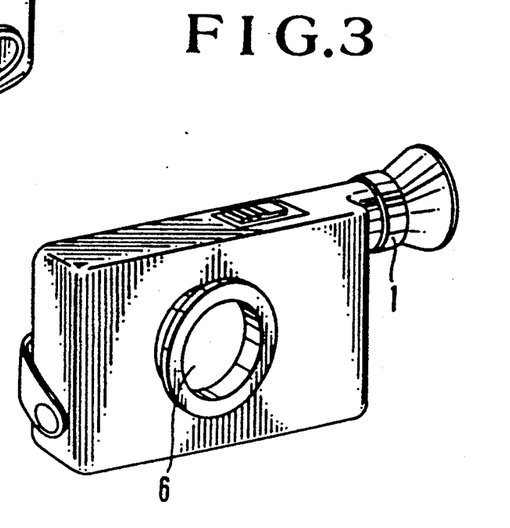
FIG. 3 is a perspective view illustrating a rotary coupling mechanism provided on a rear side of a grip.
Figure 4:
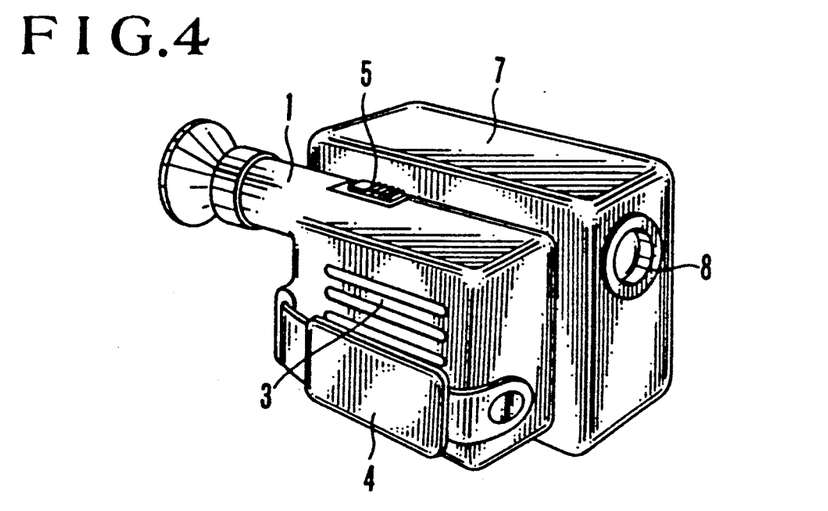
FIG. 4 is a perspective view illustrating a normal shooting state in which the viewfinder interlinked-type camera grip is installed on a camera body.
Figure 5A:
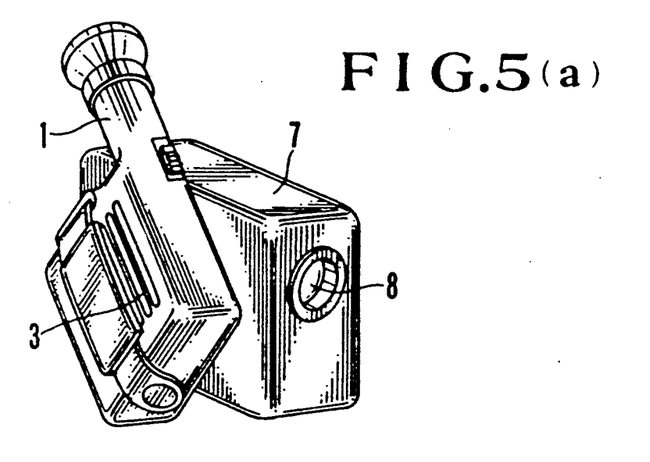
FIGS. 5(a) and 5(b) are perspective views respectively illustrating a low angle shooting state and a high angle shooting state.
Figure 5B:
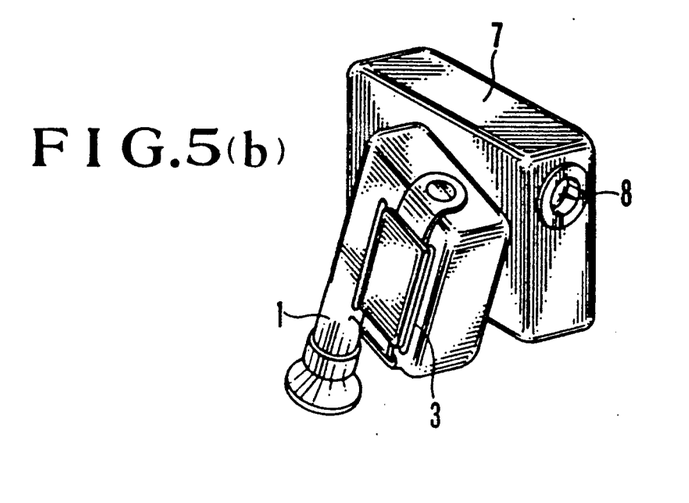

FIG. 2 is a perspective view of a viewfinder interlinked-type camera grip portion of a video camera apparatus in accordance with a first embodiment of the present invention. FIG. 3 is a perspective view illustrating a rotating mechanism which is provided on a rear surface of the grip portion 3 and is used for rotatively coupling the grip portion with a video camera body. FIG. 4 is a perspective view illustrating a normal shooting state in which the viewfinder interlinked-type camera grip portion is mounted on the camera body. FIG. 5(a) is a perspective view illustrating a low angle shooting state thereof, while FIG. 5(b) is a perspective illustrating a high angle shooting state.

Those component parts that are identical with or corresponding to those of the prior art shown in FIGS. 1(a) and 1(b) are denoted by the same reference numerals, and a description thereof will be omitted.

In FIGS. 2 to 5(b), reference numeral 1 denotes an electronic viewfinder, while reference numeral 2 denotes an eyepiece section which is provided with an eyecup. A camera grip 3 is integrated and interlinked with the electronic viewfinder 1 which is provided with the eyecup and the eyepiece section 2. A belt 4 is used for holding the hand of the operator against the camera grip 3. A lock mechanism lever 5 serves as a locking means which will be described below. A rotating mechanism 6 is an installation means for coupling the camera grip 3 with the camera body 7, and its arrangement is such that the viewfinder 1 and the camera grip 3 are rotated about this rotating mechanism 6, and are fixed at a desired rotational position, i.e., a desired shooting angle, by a single-touch operation of the lock mechanism lever 7.

FIG. 4 illustrates a normal shooting state in which the viewfinder 1 and the camera grip 3 are set at a position parallel with the direction of the optical axis of the camera after being rotated with the rotating mechanism 6 as a center. FIG. 5(a) illustrates a low angle shooting state, while FIG. 5(b) illustrates a high angle shooting state.

It should be noted that the viewfinder 1 and the camera grip 3 should not necessarily be parallel with each other, and it is desirable that they are interlinked with each other at a statistically optimum angle between them and at optimum positions.

By virtue of this arrangement, it is possible to confirm a shooting state in a state suited to a given posture by moving the viewfinder 1 in an interlinking manner to an optimum position while maintaining a grip angle for securing a natural shooting posture suited to various shooting angles. In addition, since it is unnecessary to hold the camera with the other hand, it is possible to reduce the danger of dropping the camera body 7 or causing a blurring to occur in a picture being taken in any shooting angle.

In accordance with the viewfinder-interlinked camera grip portion in accordance with one embodiment of the present invention, the camera grip 3 interlinked with the viewfinder 1 is installed rotatably on the camera body 7, and the lock mechanism lever 5 is provided for locking the camera grip 3 rotated in a desired shooting angle at that position of rotation. Therefore, in a shooting with a camera, it is possible to rotate the viewfinder 1 and the camera grip 3 in interlinking relationship with respect to the camera body 7 and lock the camera grip 3 at a desired shooting angle. Hence, there is an advantage in that it is possible to take shots positively at a natural posture with the camera grip 3 held.

The above-described lock mechanism is arranged such that the rotating portion of the camera grip 3 relative to the camera body 7 is locked by operating the lock mechanism lever 5. Accordingly, the positions of the grip and the viewfinder with respect to the camera body can be set to desired positions by operating the lock mechanism lever 5 to retain the rotating mechanism 6 of the grip at the position of rotation at that time.

Figure 6:
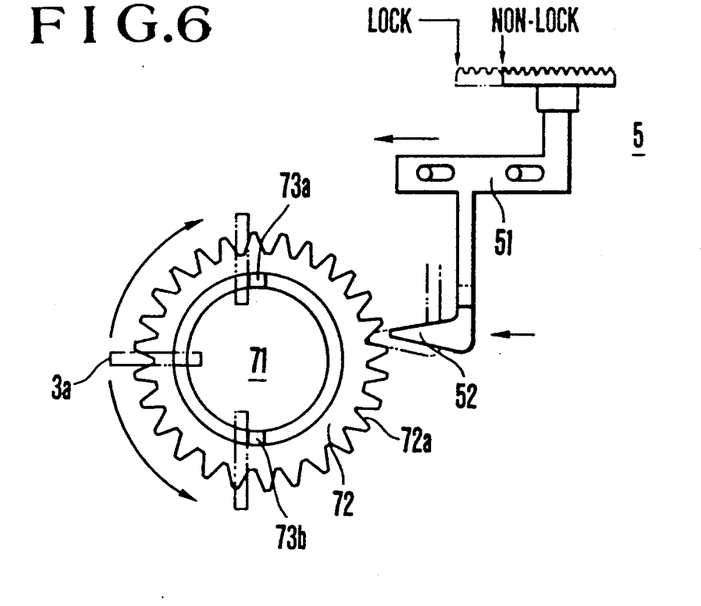
FIG. 6 is a diagram illustrating an example of a lock mechanism for locking the grip with respect to the camera body.

To illustrate one example of the lock mechanism, as shown in FIG. 6, a retaining gear 72 is provided on the video camera body 7 side opposed to the rotating mechanism 6 on the grip 3 side in such a manner as to be secured to, for instance, a coupling portion 71 for coupling with the rotating mechanism 6. If the lock mechanism lever 5 on the grip 3 side is operated, a pawl portion 52 of a retaining lever 51 is engaged with a tooth portion 72a of the gear 72 to retain the same.

In addition, an arrangement may alternatively be provided such that a plurality of engaging holes may be formed on the same peripheral surface instead of the gear 72, and by operating the lock mechanism lever 5, the retaining lever 51 is retained with any one of the engaging holes, thereby engaging the grip 3 with the camera body 7.

Furthermore, it is also possible to provide an arrangement in which a brake shoe or the like is brought into pressure contact with a rotary portion on the camera side by operating the lock mechanism lever 5 so as to retain the grip 3 relative to the camera body 7, and various other modifications are possible.

In FIG. 6, reference numerals 73a and 73b respectively denote retaining projections for limiting the rotational angle of the grip 3 by retaining an engaging portion 3a formed on the grip 3 side when the grip 3 is rotated.

Figure 7A:
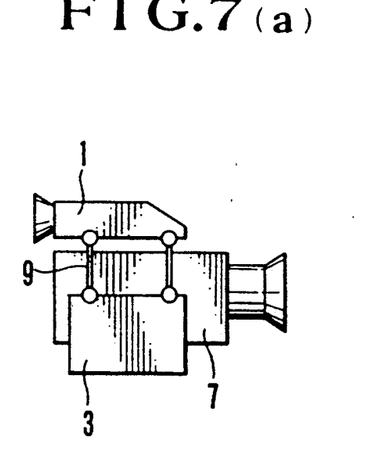
FIGS. 7(a) and 7(b) are diagrams illustrating a second embodiment.
Figure 7B:
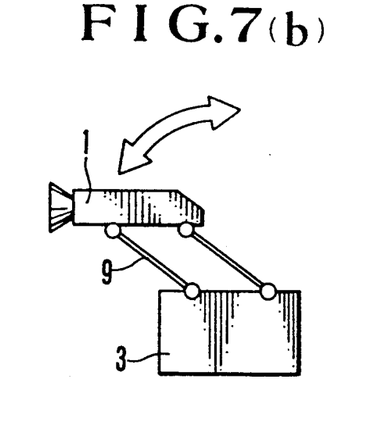

In the above-described first embodiment, the camera grip 3 and the viewfinder 1 are made integral and the camera grip 3 is rotatively installed on the camera body 7. However, a similar advantage can be displayed if, as shown in a second embodiment shown in FIGS. 7(a) and 7(b), the viewfinder 1 is rotatably coupled with the camera grip 3 by means of a parallel link 9 so as to be capable of moving in interlinking relationship in parallel with each other.

Figure 8:
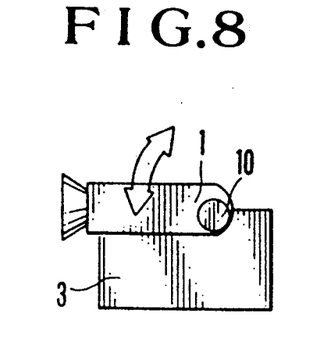
FIG. 8 is a diagram illustrating a third embodiment.

In addition, although, in the above-described embodiments, the camera grip 3 and the viewfinder 1 are made integral in interlinking relationship with each other, as shown in a third embodiment shown in FIG. 8, an arrangement may be provided such that the viewfinder 1 is rotatably connected to the camera grip 3 by means of a pivotally securing means 10, and the camera grip 3 is rotatably installed on the camera body 7.

As described above, in accordance with the present invention, since the camera grip interlinking with the viewfinder is rotatably installed on the camera body and a means is provided for setting the camera grip at a desired shooting angle, there is an advantage in that a viewfinder interlinked-type camera grip portion can be provided which allows shooting to be effected safely with the camera grip held constantly in a natural shooting posture.

The embodiment which will be described next is one in which a further improvement is provided on the above-described embodiments. Namely, shooting postures generally include one which is frequently used and the other which is not used so frequently. Such a frequency of the posture is not taken into consideration in the above-described embodiments, so that there has been leeway for improvement in this respect.

Against such a background, the embodiment which will be described below provides a video camera apparatus which is capable of speedily coping with a shooting posture whose frequency of usage is high, thereby further improving the operating efficiency.

Figure 9:
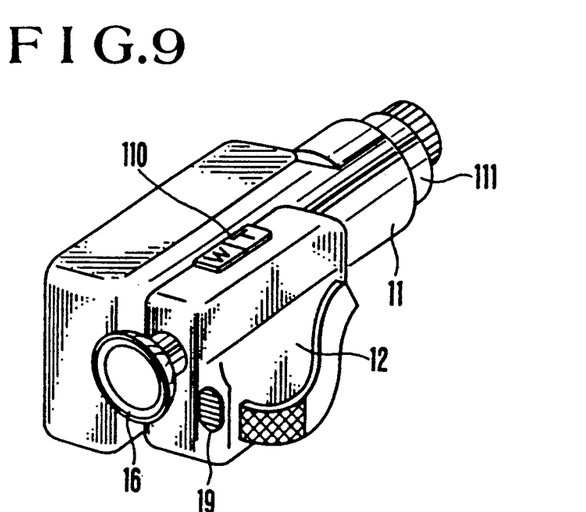
FIG. 9 is a perspective view illustrating the video camera apparatus in accordance with a fourth embodiment of the present invention.
Figure 10:
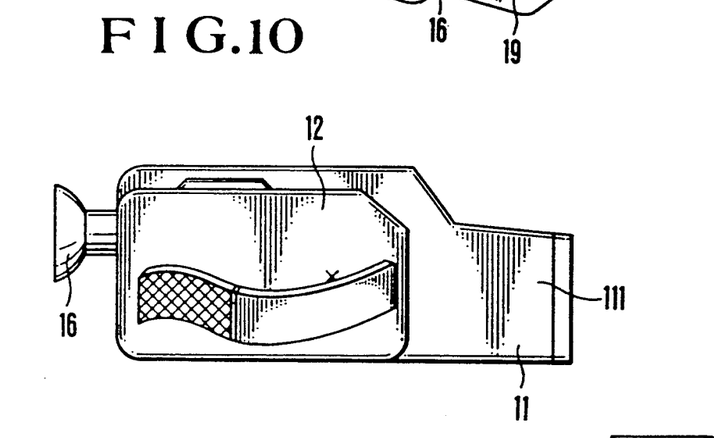
FIG. 10 is a side-elevational view of the video camera apparatus shown in FIG. 9 in the normal shooting state.
Figure 11:
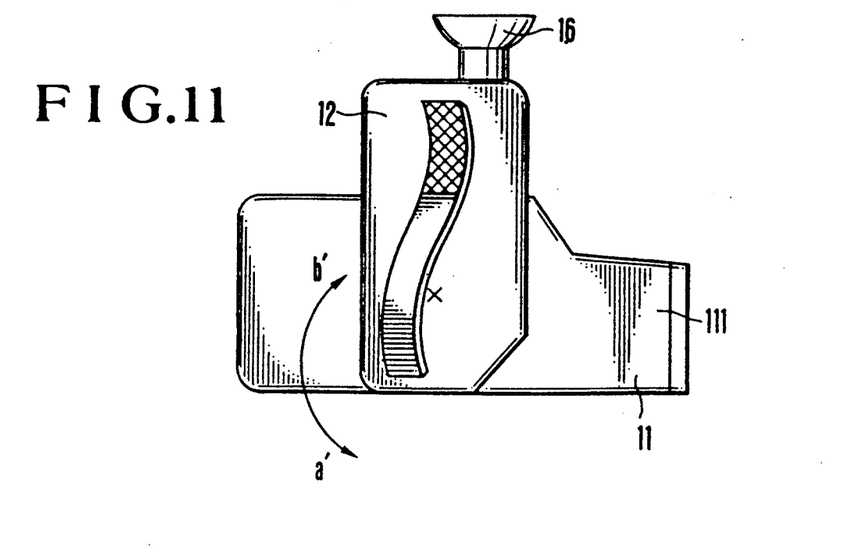
FIG. 11 is a side-elevational view of the video camera apparatus shown in FIG. 9 in the low angle shooting state.

FIG. 9 is an external perspective view of the video camera apparatus in accordance with a fourth embodiment of the present invention. In the drawing, reference numeral 11 denotes a casing for accommodating a lens barrel 111, a camera unit and a recording unit; 12, a casing for the grip portion for integrally accommodating a viewfinder eyepiece section 16 and the grip; 19, a taking trigger button; and 110, a zoom ratio changeover switch. FIG. 10 is a side elevational view, illustrating a normal shooting posture. The casings 11 and 12 are rotatably installed by means of a mechanism which will be described later. At the time of a low-angle shooting, the viewfinder eyepiece section 16 is directed upward, as shown in FIG. 11. This for instance, makes it possible to shoot a subject located at a low position, such as a child, with a comfortable posture by holding the grip. This can be realized by rotating the casing 12 for the viewfinder section and the grip portion from the state shown in FIG. 10 in the direction of an arrow b'. In addition, when the video camera apparatus is used by being fixed to the pan head of a tripod, if the video camera apparatus is set to such a state, the viewing of the picture in the eyepiece section 16 can be facilitated, improving the operating efficiency.

On the other hand, at the time of a high-angle shooting when a subject in the forward position is to be shot from the rear of a crowd of people or the like, the casing 12 is rotated in the direction of the arrow a' shown in FIG. 11. As a result, the viewing of the picture in the eyepiece section 16 can be facilitated, and the holding of the grip can also be facilitated.

The state whose frequency of usage is generally the highest is the case where shooting is effected with the lens barrel 111 set at the height of the eye. In this case, it is desirable in view of the operating efficiency that the casings 11 and 12 be set in the state such as the one shown in FIGS. 9 and 10.

Figure 12:
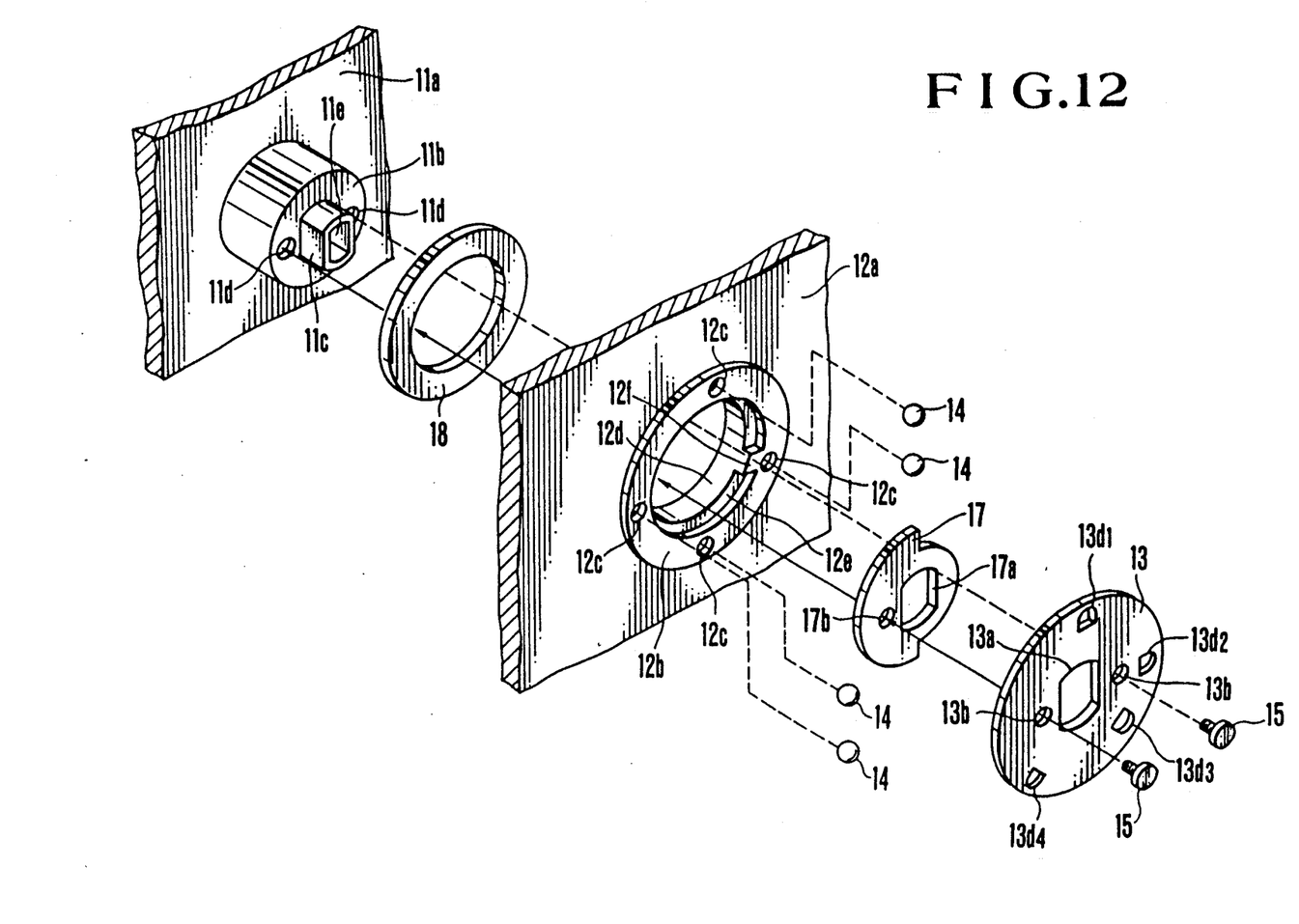
FIG. 12 is an exploded perspective view illustrating an installing mechanism for a viewfinder casing and a camera-side casing.
Figure 13:
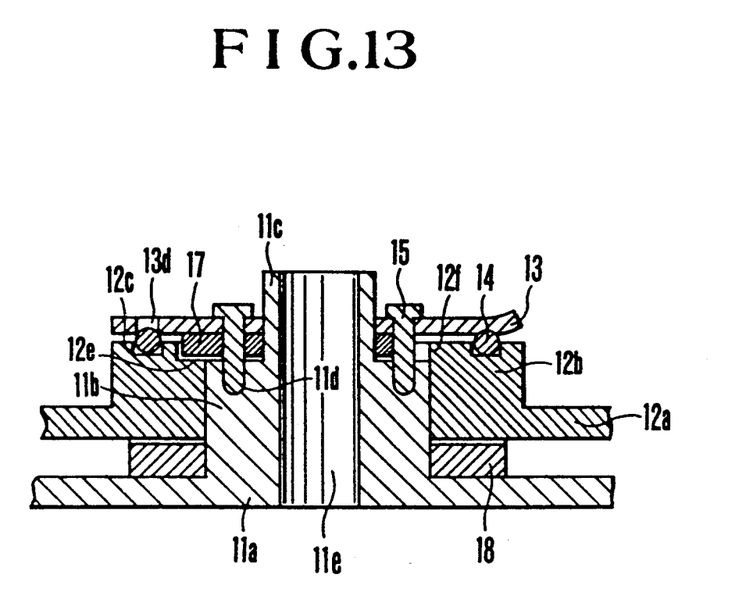
FIG. 13 is a side cross-sectional view of the installing mechanism shown in FIG. 12.

A description will now be given of a mechanism for installing the casings 11 and 12, which has been devised in view of the frequency of usage. FIG. 12 is an exploded perspective view of the mechanism for rotatably retaining the two casings in accordance with this embodiment, while FIG. 13 is a cross-sectional view of the mechanism shown in FIG. 12.

In the drawings, reference numeral 11a denotes an outer wall of the camera-side casing 11, and numeral 12a is an outer wall of the grip-side casing 12, the outer wall 11a being provided with a cylindrical projection 11b, and a projection 11c being further provided on the cylindrical projection 11b. Two screw holes 11d are provided in an upper surface of the cylindrical projection 11b, and a through hole 11e is provided on the inner diameter side of the projection 11c. A frictional member 18 has a circular hole in its center, and the cylindrical projection 11b is inserted into the circular hole of this frictional member 18.

A cylindrical projection 12b is provided on the outer wall 12a, and a circular through hole 12d is formed in the center of this cylindrical projection 12b. A stepped portion 12e is provided on an inner wall surface of the through hole 12d, and a projection 12f is provided at a predetermined phase of the stepped portion 12e. In addition, four circular recesses 12c are provided on an upper surface of the cylindrical projection 12b. The aforementioned cylindrical projection 11b is further inserted into the through hole 12d. Four steel balls 14 are respectively placed in the four circular recesses 12c. In addition, a stopper 17 is provided with a hole 17a fitting with the projection 11c and has a large-diameter portion and a small-diameter portion which are offset from each other 180°. A screw hole 17b of the stopper 17 corresponds to the screw hole 11d. A circular leaf spring 13 serves as an urging member and is provided with a hole 13a which is similar to the hole 17a of the stopper 17 and fits with the projection 11c The leaf spring 13 is secured to the upper surface of the cylindrical projection 11b by means of two screws 15 via two holes 13b. As a result, the stopper 17 and the leaf spring 13 are prevented from rotating with respect to the casing 11. Although the outer wall 12a becomes rotatable relative to the outer wall 11a, the leaf spring 13 presses the outer wall 12a against the outer wall 11a via the balls 14 and the frictional member 18, and the casing 12 is retained stably against the casing 11 by means of the friction of this frictional member 18.

The large-diameter portion of the stopper 17 is fitted with the stepped portion 12e so as to limit the rotating range of the projection 12f, i.e., the rotating range of the casing 12, to within 180°. This arrangement is adopted with a view to preventing a cutoff or the like of a wire which electrically connects the two casings 11 and 12 through the through hole 11e if the casing 12 is rotated a number of turns with respect to the casing 11. This rotating range is set in the range in which the projection 12f rotates 180° from the state shown in FIG. 11 in the direction of an arrow a'. This setting is made since this range is the one which is necessary when shots are taken.

The circular recesses 12c are located at four locations with a 90° phase difference between adjacent ones of them, and the balls 14 are respectively placed therein. However, when the phase of rotation of the casings 12 and 11 is a predetermined phase, any of the balls 14 is caught in holes $13d_1$, $13d_2$, $13d_3$ and $13d_4$ of the leaf spring 13. At this time, the pressing of the casing 12 by the leaf spring 13 against the casing 11 is alleviated, so that the state of a click is obtained. The holes $13d_2$, $13d_3$ and $13d_4$ are provided with phase differences of 67.5°, 112.5° and 225° with respect to the hole $13d_1$, respectively. If he phase of one of the balls 14 caught in any one of the holes $13d_1$ to $13d_4$ is offset by $(n \times 22.5)°$, any one of the balls 14 is bound to be caught in any of the holes $13d_1$ to $13d_4$. Namely, a click is heard each time the casing 12 is rotated 22.5° with respect to the casing 11. It goes without saying that a click is unfailingly obtained in the state whose frequency of usage shown in FIGS. 9 and 10.

As the above-described arrangement is provided, a click is heard each time the casing 12 is rotated by a predetermined angle with respect to the casing 11, and a click is produced in the state whose frequency of use is the highest. Therefore, it is possible to adjust the apparatus to this state whose frequency of usage is high. At the same time, the casing 12 is supported stably with respect to the casing 11 in this state. In addition, a feeling of usage becomes extremely favorable.

In the above-described embodiment, a description has been given of a camera integrated-type VTR as an example, but a similar effect can be demonstrated when the invention is applied to the single unit of the camera.

As described above, in accordance with the present invention, it is possible to obtain a video camera which excels in the operating efficiency in any shooting posture and which is speedily adaptable to a change in a shooting posture.

A description will now be given of a mechanism for installing a battery of the video camera in accordance with the fourth embodiment of the present invention.

Figure 14:
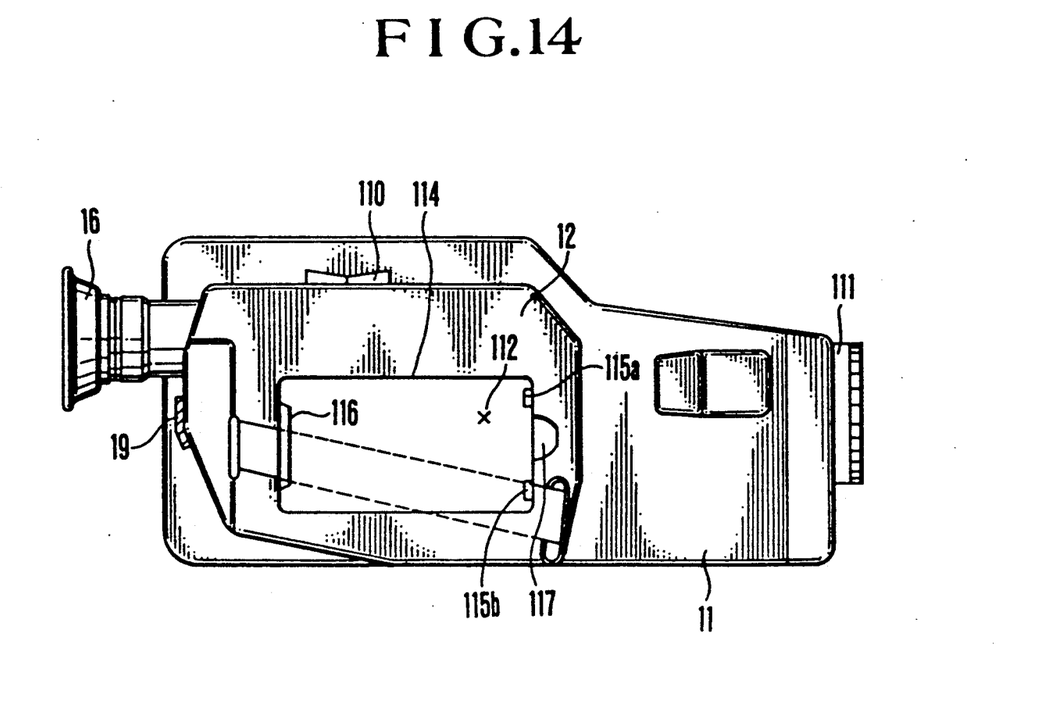
FIG. 14 is a side-elevational view of the apparatus of the present invention centering on a mechanism for installing a battery on a viewfinder casing.
Figure 15:
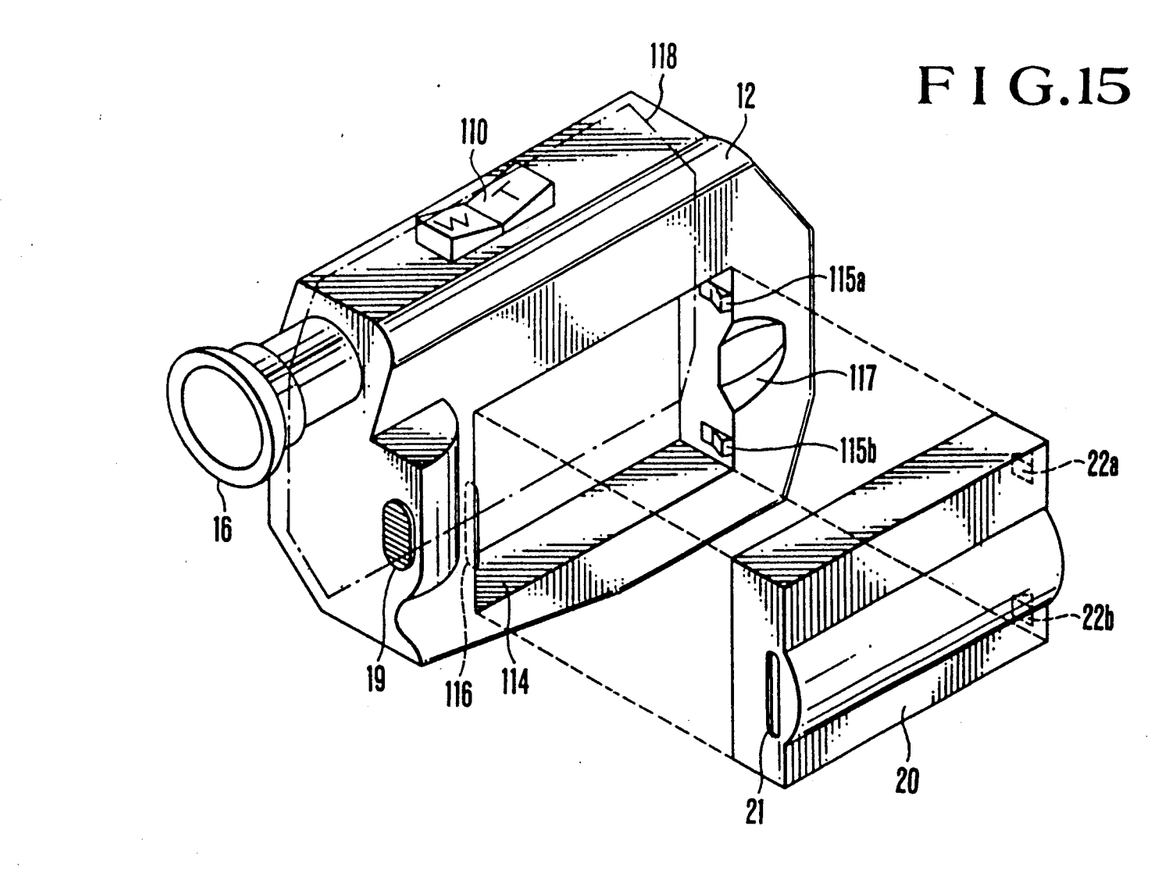
FIG. 15 is an exploded perspective view illustrating the mechanism for installing the battery one the viewfinder casing.

FIG. 14 is a side-elevational view illustrating the mechanism of installing a battery of the video camera in accordance with the present invention, and FIG. 15 is an exploded perspective view of the viewfinder casing and the battery, illustrating the battery installing mechanism. In each of the drawings, the viewfinder casing 12 is provided with an opening 114 for accommodating the battery, and the opening 114 is provided inside thereof with a hook 116 and contacts 115a and 115b formed of a resilient material. In addition, the opening 114 is provided at one end thereof with a finger-inserting recess 117. Meanwhile, a battery 20 is provided with a hook 21 at a position corresponding to the hook 116, and is provided with resilient contacts 22a and 22b at positions corresponding to the contacts 115a and 115b.

If the battery 20 is inserted into the opening 114 in state in which the hook 21 of the battery 20 is engaged with the hook 116 inside the opening 114, the resilient contacts 22a and 22b are brought into contact with the resilient contacts 115a and 115b. The battery 20 is accommodated in the opening 114 when these resilient contacts override the mutually abutting contacts. At this time, the battery 20 is secured to the inside of the opening 114 by means of the urging forces of the resilient contacts, and the power of the battery 20 is supplied to each part of the viewfinder casing 12 though these resilient contacts. In addition, this power is also supplied to the camera-side casing 11 via the through hole 11e shown in FIG. 12. When removing the battery 20 from the viewfinder casing 12, a finger is inserted into the finger-inserting recess 117 to cancel the engagement between the resilient contacts 115a, 115b and the resilient contacts 22a, 22b. In FIG. 15, an electrically conductive plate 118 is disposed adjacent to an end surface of the viewfinder casing 12 confronting the camera-side casing 11 and functions as an electromagnetic shielding plate.

Figure 16:
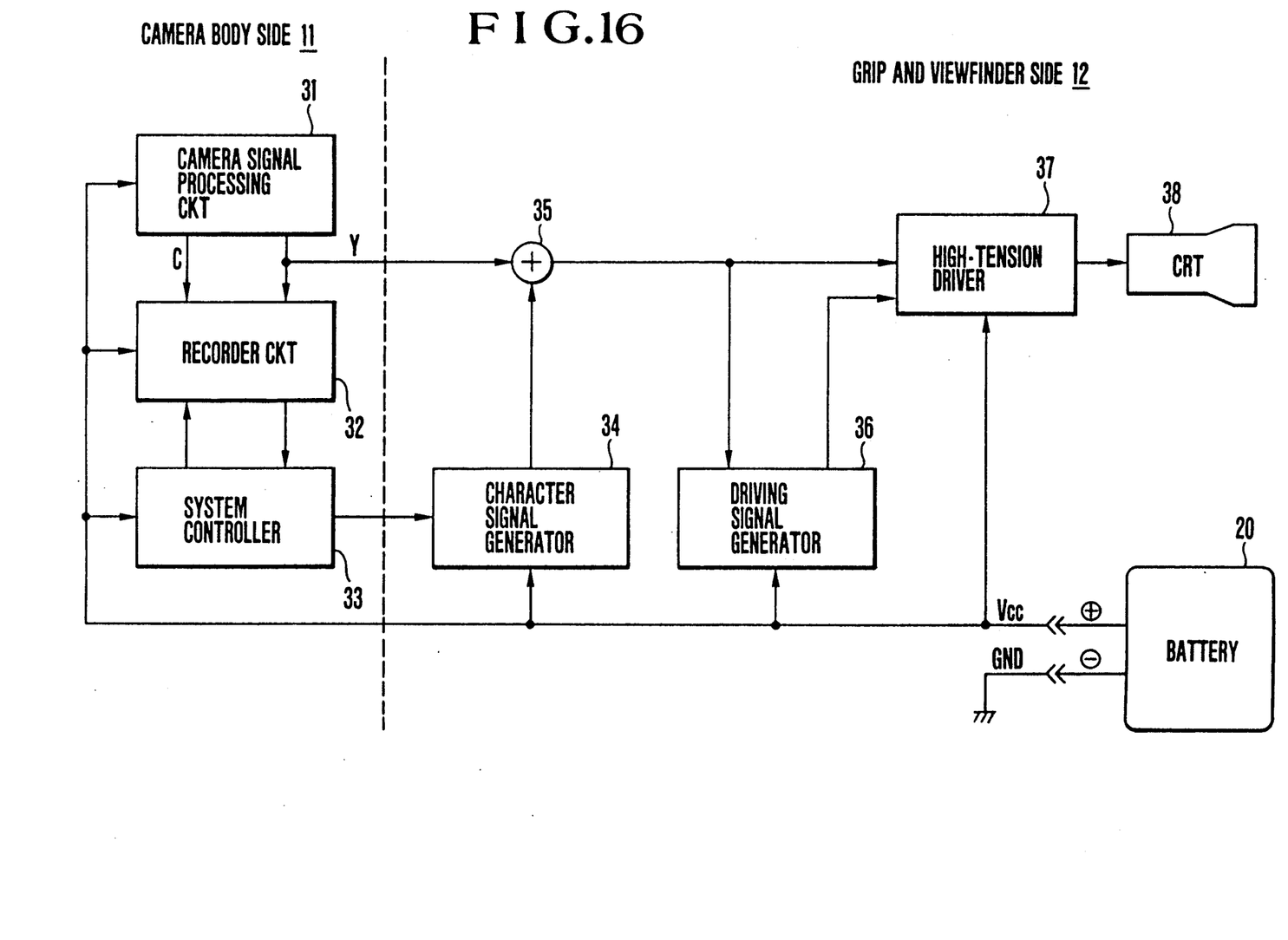
FIG. 16 is a block diagram illustrating a circuit configuration of a video camera apparatus in accordance with one embodiment of the present invention.

A description will now be given of a circuit configuration of the camcorder having the above-described arrangement in accordance with the present invention. FIG. 16 is a schematic circuit diagram of the camcorder in accordance with this embodiment. The left-hand portion with respect to the dotted line indicates portions that are housed in the camera-side casing 11, while the right-hand side shows portions accommodated in the viewfinder casing 12.

In the drawing, a camera signal processing circuit 31 generates a luminance signal (Y) and a chrominance signal (C) on the basis of a signal output from an image pickup device (not shown). A recorder circuit 32 includes a recording signal processing circuit for recording the luminance signal and the chrominance signal output from the camera signal processing circuit 31 on a magnetic tape as well as a control circuit for controlling a recording unit. A system controller 33 controls the recorder circuit 32 and a character signal generator 34. The character signal generator 34 generates a character signal in accordance with the data generated by the system controller 34. A mixing circuit 35 mixes the character signal output from the generator 34 and the luminance signal output from the camera signal processing circuit 31. A driving signal generator 36 generates a horizontal deflecting signal, a vertical deflecting signal, etc. for driving a CRT 38 on the basis of a periodical signal in the video signal output from the mixing circuit 35. A high-tension driver 37 drives the CRT 38 in accordance with the video signal produced by the mixing circuit 35 and the horizontal and vertical deflecting signals.

The battery 20 is installed on the viewfinder casing 12, and supplies power to various parts of both the viewfinder casing 12 and the camera-side casing 11. As illustrated in the drawing, the camera signal processing circuit 31, the recorder circuit 32, and the system controller 33 are accommodated in the camera-side casing 11, while the character signal generator 34, the driving signal generator 36, and the high-tension driver 37 are accommodated in the viewfinder casing 12.

As the above-described configuration is provided, the camera signal processing circuit 31 and a signal processing circuit in the recorder circuit 32 on the one hand, and the character signal generator 34, the driving signal generator 36, and the high-tension driver 37 on the other, are accommodated in separate casings. At the same time, the electrically conductive plate 118 is interposed therebetween. Therefore, the circuits in the viewfinder casing 12 are prevented from exerting an adverse effect on the video signals being processed in each circuit in the camera-side casing 11. In addition, since the battery 20 is provided on the viewfinder casing 12, circuits which require large electric power can be arranged on the viewfinder casing 12 side.

In the above-described embodiment, a description has been given of a case where the present invention is applied to a camera integrating-type VTR, a similar effect can be obtained if the invention is applied to the signal unit of the camera which is not provided with the recorder unit.

As described above, the video camera in accordance with the present invention excels in the operating efficiency in any shooting posture, and circuits involved in the electronic viewfinder are prevented from exerting an adverse effect on processing circuits of the video signal.

What is claimed is:

1. A video camera apparatus, comprising:
A) a camera body containing therein at least a photographing lens optical system, image pick-up means for picking up an image of an object formed by said photographing lens optical system and photoelectrically converting said image of the object into an image signal, and recording or reproducing means for recording the image signal output from said image pick-up means on a recording medium or reproducing a recorded information recorded on said recording medium;
B) a grip rotatably mounted on said camera body to support said camera body, said grip containing therein monitor means for displaying the image signal output from said image pick-up means or the reproduced signal reproduced from said recording medium by said recording or reproducing means, driving means for driving said monitor means and control information generating means for superimposing an information signal indicating an operating state of said camera body on a picture plane of said monitor means; and
C) a shielding member disposed on an inside wall of said grip which forms a mounting side confronting said camera body.

2. An apparatus according to claim 1, wherein said shielding member is arranged to shield an influence of an output of said control information generating means on the image pick-up means and the recording and/or reproducing means contained in said camera body.

3. An apparatus according to claim 1, wherein the driving means contained in said grip includes a driving signal generator for said monitor means and a high voltage circuit such as a high voltage driver.

4. An apparatus according to claim 3, wherein said grip further includes a battery which constitutes a power source of the apparatus.

5. A video camera apparatus, comprising:
A) a camera body containing therein at least a photographing lens optical system, image pick-up means for picking up an image of an object formed by said photographing lens optical system and photoelectrically converting said image of the object into an image signal, and recording and/or reproducing means for recording the image signal output from said image pick-up means on a recording medium and/or reproducing a recorded information recorded on said recording medium;

B) a grip rotatably mounted on said camera body to support said camera body, said grip containing therein monitor means for displaying the image signal output from said image pick-up means or the reproduced signal reproduced from said recording medium by said recording and/or reproducing means, driving means for driving said monitor means and control information generating means for superimposing an information signal indicating an operating state of said camera body on a picture plane of said monitor means;

said grip being formed with a plane which is positioned in the same plane as that including a bottom surface of said camera body at a first rotated position where a direction of an optical axis of the monitor means contained in said camera grip coincides with a direction of an optical axis of the photographing lens optical system contained in said camera and at another rotated position where the direction of the optical axis of the monitor means is perpendicular to the direction of the optical axis of said camera body.

6. An apparatus according to claim 5, wherein the rotated position where the direction of the optical axis of said monitor means is perpendicular to the direction of the optical axis of said camera body is the position where said grip is rotated for substantially 90° in an upward direction relatively to the camera body.

7. An apparatus according to claim 5, wherein said camera body and said grip are rotatable relatively to each other for substantially 180°.

8. An apparatus according to claim 7, wherein said camera body and said grip include a click stop mechanism arranged to be stopped at every time when they are relatively rotated for a predetermined angle to each other and said click stop mechanism stops said camera body and said grip at a rotated position where the frequency of use is highest.

9. An apparatus according to claim 8, wherein said camera body and said grip are stopped at every 22.5° rotational phase.

10. A video camera apparatus, comprising:
(A) a camera body containing therein at least a photographing lens optical system, image pick-up means for photoelectrically converting an image of an object picked up by said photographing lens optical system into an image signal and recording and/or reproducing means for recording the image signal output from said image pick-up means on a recording medium and/or reproducing an information recorded on said recording medium;
(B) a grip rotatably mounted on said camera body to support said camera body, said grip containing therein an electronic viewfinder for displaying the image signal output from said image pick-up means or the reproduced signal reproduced from said recording medium by said recording and/or reproducing means; and
(C) locking means for locking said camera body and said grip at a relatively rotated position, said locking means including a first member disposed on said camera body, a second member disposed on said grip and arranged to engage with said first member to lock the camera body and the grip at the relatively rotated position and operating means disposed on said grip to lock or unlock said locking means.

11. An apparatus according to claim 10, wherein said camera body and said grip are relatively rotatable to each other for about 180°.

12. An apparatus according to claim 11, wherein said camera body and said grip can be locked to each other by said locking means at every rotation of a predetermined angle.

13. An apparatus according to claim 12, wherein the first member of said locking means disposed on said camera body includes an engaging ring disposed on the rotating part of said grip and formed with a plurality of engaging projections, and the second member of said locking means includes a locking lever which is arranged to be engageable between the respective engaging projections of said engaging ring and which is resiliently urged toward said engaging ring by means of spring.

* * * * *

UNITED STATES PATENT AND TRADEMARK OFFICE
CERTIFICATE OF CORRECTION

PATENT NO. : 5,043,822
DATED : August 27, 1991
INVENTOR(S) : Hiroyuki Ichiyoshi and Kazunori Kashimura It is certified that error appears in the above-identified patent and that said Letters Patent is hereby corrected as shown below:

Col. 1, line 44. Change "us" to -- is --
Col. 4, line 34. Change "one" to -- on --
Col. 4, lines 50-62. Delete entire paragraph.
Col. 6, line 20. Change "displayed" to -- obtained --
Col. 8, line 29. Change "he" to -- the --
Col. 8, line 52. Delete "the"
Col. 9, line 16. Change "though" to -- through --
Col. 9, line 54. Change "periodical" to -- periodic --

Signed and Sealed this

Eighth Day of December, 1992

*Attest:*

DOUGLAS B. COMER

*Attesting Officer*          *Acting Commissioner of Patents and Trademarks*